July 14, 1936.  J. W. DECKER  2,047,621
PNEUMATIC VIBRATION ABSORBING DEVICE
Filed May 14, 1928
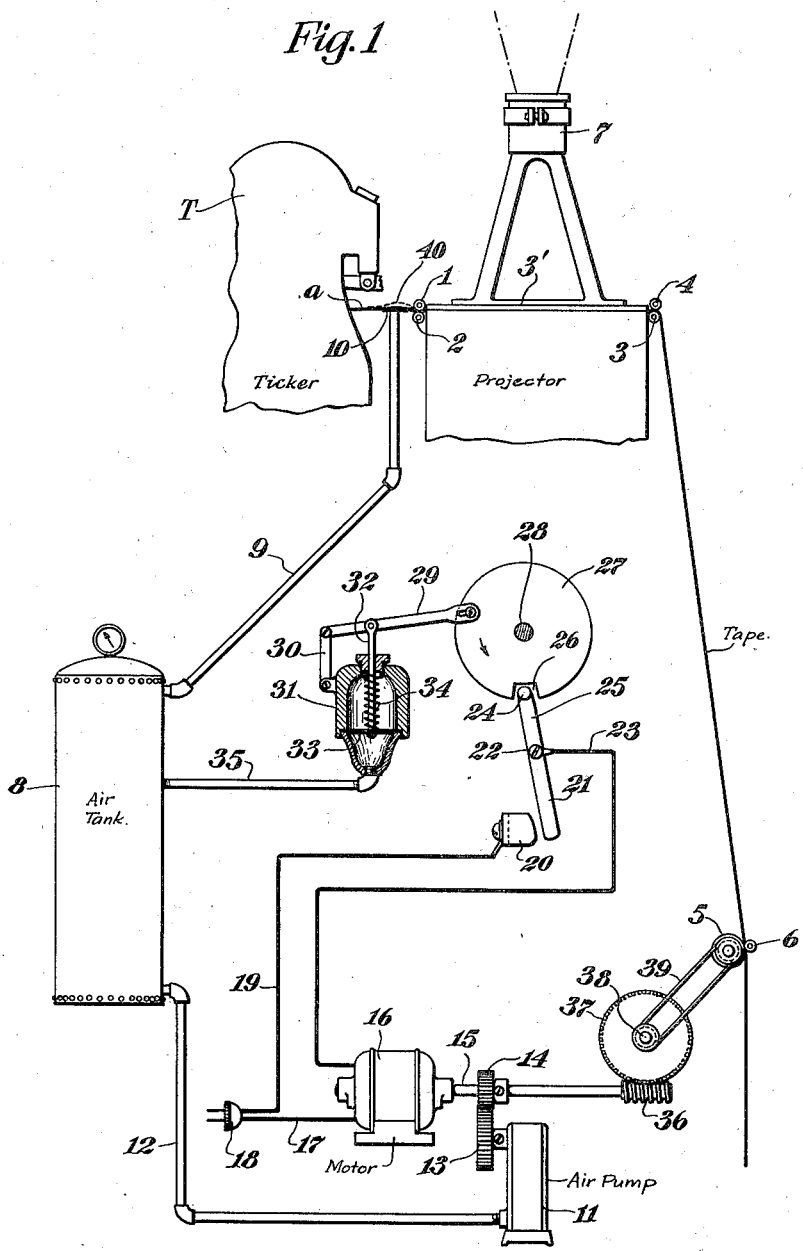
INVENTOR
James W. Decker,
BY
Gustav Drews
ATTORNEY Patented July 14, 1936

2,047,621

UNITED STATES PATENT OFFICE 2,047,621

PNEUMATIC VIBRATION ABSORBING DEVICE

James W. Decker, New York, N. Y.

Application May 14, 1928, Serial No. 277,602

8 Claims. (Cl. 88—24)

This invention relates to stock quotation projecting machines in general.

Among the objects of the present invention it is aimed to provide a stock quotation projecting machine including a ticker, projecting apparatus and a pneumatic device for absorbing the vibrations transmitted to the tape by the ticker before the tape reaches the projecting machine.

These and other features, capabilities and advantages of the present invention will appear from the subjoined detail description of one specific embodiment thereof illustrated in the accompanying drawing showing diagrammatically the connections of the several elements.

Figure 1 is an elevation diagrammatically showing the connections of the several elements and Figure 2 is a fragmental detail plan of the mouth of the air discharge.

In the embodiment illustrated, the tape $a$ is ejected from the ticker T and from there passes between the idlers 1 and 2 to the light receiving station 3' from which the tape $a$ passes between the idlers 3 and 4 down to the tape drawing roller 5 into engagement with which the tape $a$ is maintained by the idler 6.

In this mechanism, images of the quotations printed on the tape $a$ by the ticker T are projected through the projecting lens contained in the housing 7 to a screen not shown similar to the projecting apparatus shown and illustrated in my copending application Serial No. 253,302.

The present invention relates mainly to absorbing the vibrations transmitted by the ticker to the tape so that the tape will pass through the projecting station 3' in a comparatively smooth manner. If such vibrations are not dissipated before the tape passes into the projecting station 3', these vibrations will be projected with the quotations magnified several times. When so magnified, the vibrations will of course be accentuated to such an extent as to interfere with the reading of the projections on the screen. An inspection of the screen for any length of time when such vibrations are not dissipated will obviously cause the observer an objectionable eye strain.

The device here provided for dissipating the vibrations or absorbing the vibrations is a pneumatic device which will now be described.

An air pressure tank 8 is connected by the conduit 9 with the tape supporting disk 10 in which there is provided a small air passage. By means of the air pressure being stored in the tank 8, the air therefrom will issue through the disk 10 to deflect the tape $a$ into a loop in which loop the vibrations from the ticker will be absorbed. The air pressure will have the effect of causing the tape to cooperate with the idler 1 to press the tape against such idler 1 which will serve as a friction creating device to engage the tape and interrupt the vibrations transmitted thereto by the ticker, in the same manner as the finger of a musician will interrupt the vibrations on a violin string.

The air tank 8 is supplied with air by means of the air pump 11 which is connected to the air tank by the conduit 12. The air pump 11 is provided with a gear 13 in mesh with the gear 14 on the shaft 15 of the motor 16. The motor 16, in the present instance, is connected by the conductor 17 with the outlet 18, which outlet 18 is connected by the conductor 19 with the switch contact 20. The switch contact 20 is adapted to cooperate with the movable contact 21 pivoted at 22, which contact 21 is connected by the conductor 23 with the motor 16. The movable contact 21 has the projection 24 of one of its arms 25 positioned in the recess 26 of the disk 27 pivoted on the shaft 28. The disk 27 is connected by the link 29 with the link 30 pivoted to the housing 31 of a pressure regulator. The pressure regulator has a stem 32 slidably mounted thereon and provided with a pressure sensitive diaphragm 33. Between the diaphragm 33 and the upper end of the housing 31, the stem 32 is provided with a compression spring 34 for exercising a downward pressure on the diaphragm in opposition to the pressure contained in the tank 8 which passes to the diaphragm by means of the conduit 35. The shaft 15 of the motor 16 is provided with a worm 36 in mesh with the worm wheel 37 pivoted on the shaft 38 which is connected by the belt 39 with the drawing roller 5.

The diaphragm 33 and spring 34 will be adjusted so that when the passage of air is stopped from issuing through the disk 10, sufficient pressure will be developed to deflect the diaphragm 33 upward, thereby to actuate the lever 29 to rotate the disk 27 to bring the movable contact 21 out of engagement with the fixed contact 20 when the current to the motor 16 will be cut off in turn to cause the air pump 11 and drawing roller 5 to be stopped.

The position of the tape $a$ so that it will shut off the opening through the disk 10 will be effected only when the ticker T stops, at which time the roller 5 will continue to draw the tape until the slack in the tape at the position 40 above the disk 10 has been taken up in turn to cause the tape to lie flat against the disk 10.

As soon as the ticker T again starts to transmit messages in turn to eject the tape a, the tape a will first form slack at the location 40 to open the passage of air through the disk 10 and permit the air pressure in the tank 8 to discharge. As the same discharges and the pressure reduces sufficiently to permit the diaphragm 33 to assume its normal position, it will withdraw the lever 29 to actuate the disk 27 in turn to actuate the movable contact 21 into engagement with the fixed contact 20 when the current to the motor 16 will be established to cause the motor to be actuated in turn to cause the air pump 11 and drawing roller 5 to be actuated.

It is obvious that various changes and modifications may be made to the details of construction without departing from the general spirit of the invention as set forth in the appended claims.

I claim:

1. The combination with a ticker having a printing mechanism and a tape ejecting mechanism, of a projecting machine, a tape drawing device for drawing the tape through the projecting machine, and means including a roller and a pneumatic device adjacent to one another but not opposite to one another for dissipating the vibrations transmitted to the tape before the tape passes to the projecting machine, said roller disposed above, and effecting a drag on, the upper face of the tape and said pneumatic device disposed below, and effecting a drag on, the lower face of the tape to form a deflection in the tape at the entrance to the projecting machine.

2. The combination with a ticker having a printing mechanism and a tape ejecting mechanism, of a projecting machine, a tape drawing device for drawing the tape through the projecting machine, a pressure tank, and means including a roller and a device for feeding pressure from said pressure tank to the tape between said ticker and said projecting machine, said roller engaging one face of the tape and said device exercising a force on the other face of the tape transverse to the path of movement of the tape to effect a drag on the tape in turn to dissipate the vibrations transmitted to the tape by the ticker.

3. The combination with a ticker having a printing mechanism and a tape ejecting mechanism, of a projecting machine, a tape drawing device for drawing the tape through the projecting machine, a pressure tank, a conduit connected to said pressure tank, and an apertured disk at the end of said conduit disposed between said ticker and projecting machine to be engaged by said tape to close the aperture when said ticker is arrested, the aperture being open when said ticker operates to permit the air pressure from said tank to blow onto said tape and form a vibration absorbing loop.

4. The combination with a ticker having a printing mechanism and a tape ejecting mechanism, of a projecting machine, a tape drawing device for drawing the tape through the projecting machine, a pressure tank, a conduit connected to said pressure tank, an apertured disk at the end of said conduit disposed between said ticker and projecting machine to be engaged by said tape to close the aperture when said ticker is arrested, the aperture being open when said ticker operates to permit the air pressure from said tank to blow onto said tape and form a vibration absorbing loop, an air pump connected to said pressure tank to supply pressure thereto, a motor connected to said air pump, a switch operatively connected to said motor, and a switch controlling device operatively associated with said pressure tank to open said switch when the pressure rises in said tank due to the closing of the aperture in said disk.

5. The combination with a ticker having a printing mechanism and a tape ejecting mechanism, of a projecting machine, a tape drawing device for drawing the tape through the projecting machine, a pressure tank, a conduit connected to said pressure tank, an apertured disk at the end of said conduit disposed between said ticker and projecting machine to be engaged by said tape to close the aperture when said ticker is arrested, the aperture being open when said ticker operates to permit the air pressure from said tank to blow onto said tape and form a vibration absorbing loop, an air pump connected to said pressure tank to supply pressure thereto, a motor connected to said air pump, a switch operatively connected to said motor, a switch controlling device operatively associated with said pressure tank to open said switch when the pressure rises in said tank due to the closing of the aperture in said disk, and means for operatively connecting said tape drawing device to said motor to be driven thereby.

6. The combination with a ticker, of a projecting machine frame having a light aperture, a tape drawing device for drawing the tape through said projecting machine frame as it is discharged by the ticker, and means including an abutment independent of said frame and secured thereto, and a pneumatic device disposed on opposite sides of the tape between the ticker and projecting machine for dissipating the vibrations transmitted to the tape by the ticker, said abutment effecting a drag on one face of the tape and said pneumatic device effecting a drag on the other face of the tape to form a deflection in the tape at the entrance to the projecting machine thereby supplementing one another in increasing the effective drag on the tape.

7. The combination with a ticker, of a projecting machine, a tape drawing device for drawing the tape through the projecting machine as it is discharged by the ticker, and means including an abutment and a pneumatic device engaging adjacent areas of the tape between the ticker and projecting machine for dissipating the vibrations transmitted to the tape by the ticker, said abutment being effective on one face of the tape and said pneumatic device being effective on the other face of the tape, one of said means acting to increase the effect of the other of said means.

8. In combination, a printing device from which a printed tape is ejected, and a conduit for directing a jet of air on the tape section between said printing device and a projection field whereby said tape section is maintained in loop formation.

JAMES W. DECKER.